US00RE41443E

(19) United States
(12) Reissued Patent
Kato et al.

(10) Patent Number: US RE41,443 E
(45) Date of Reissued Patent: Jul. 20, 2010

(54) INPUT DEVICE WHICH ALLOWS BUTTON INPUT OPERATION AND COORDINATE INPUT OPERATION TO BE PERFORMED IN THE SAME OPERATION PLANE

(75) Inventors: Katsumi Kato, Fukushima-ken (JP); Yasuji Hagiwara, Fukushima-ken (JP); Masahiro Soma, Fukushima-ken (JP); Tadamitsu Sato, Fukushima-ken (JP)

(73) Assignee: Alps Electric Co., Ltd., Toyko (JP)

(21) Appl. No.: 11/328,496

(22) Filed: Jan. 9, 2006

Related U.S. Patent Documents

Reissue of:
(64) Patent No.: 6,704,005
Issued: Mar. 9, 2004
Appl. No.: 09/922,110
Filed: Aug. 3, 2001

(30) Foreign Application Priority Data

Aug. 11, 2000 (JP) ..... 2000-243779

(51) Int. Cl.
*G06F 3/041* (2006.01)

(52) U.S. Cl. ..... 345/173; 345/174; 345/176; 178/18.01; 178/18.03; 178/18.05; 178/18.06; 178/18.07

(58) Field of Classification Search ..... 345/168–179; 178/18.01–18.09, 20.01–20.04
See application file for complete search history.

(56) References Cited

U.S. PATENT DOCUMENTS 5,666,113 A 9/1997 Logan et al.
5,726,684 A 3/1998 Blankenship et al.
5,917,906 A 6/1999 Thornton et al.
5,988,902 A 11/1999 Holehan et al.
6,118,435 A 9/2000 Fujita et al.
6,243,080 B1 6/2001 Molne
6,415,138 B2 7/2002 Sirola et al.
6,429,846 B2 8/2002 Rosenberg et al.
6,704,005 B2 * 3/2004 Kato et al. ..... 345/173
2003/0016211 A1 1/2003 Woolley
2003/0048262 A1 3/2003 Wu et al.

FOREIGN PATENT DOCUMENTS

GB 2 322 008 8/1998
JP 8-95691 4/1996
JP 09-251347 9/1997

OTHER PUBLICATIONS

Copy of Search Report for corresponding European Patent Application No. 01 30 5467.

* cited by examiner

*Primary Examiner*—Vijay Shankar
(74) *Attorney, Agent, or Firm*—Brinks Hofer Gilson & Lione

(57) ABSTRACT

An input device includes a pressure-sensitive or capacitive planar input unit with an indicator sheet which has input sections being secured to the surface of the planar input unit. A tactile feedback generator is provided at the back side of the planar input unit. The tactile feedback generator includes dome-shaped inversion plates that are separately provided at locations corresponding to the input sections and provide feedback to the operator. When an input section is pressed, an operation signal in accordance with what is indicated at the pressed input section is generated.

83 Claims, 7 Drawing Sheets

INPUT DEVICE WHICH ALLOWS BUTTON INPUT OPERATION AND COORDINATE INPUT OPERATION TO BE PERFORMED IN THE SAME OPERATION PLANE

Matter enclosed in heavy brackets [ ] appears in the original patent but forms no part of this reissue specification; matter printed in italics indicates the additions made by reissue.

*This application claims the benefit of priority to Japanese patent application No.: 2000-243779, which was filed on Aug. 11, 2000.*

BACKGROUND OF THE INVENTION

1. Field of the Invention

The present invention relates to an input device which allows a button input operation and a coordinate input operation to be performed in the same operation plane.

2. Description of the Related Art

An input device, such as a portable telephone, includes, for example, a pushbutton input, and can be used to perform various operations, such as inputting a telephone number and starting/ending talking on the telephone.

In recent years, internet connecting environments making use of portable telephones increased, so that various services are being provided using portable telephones. Accordingly, various menus are displayed on displays of portable telephones, and menu selections are frequently made.

When menu selections are being made using conventional input devices, a menu selectable location is moved by a push-type or a stick-type direction-indicating input which is provided separately of the pushbutton input of a portable telephone.

However, the operability of the above-described conventional input device is impaired because the pushbutton input operation and the menu selection input operation are carried out using different input mechanisms. In addition, the conventional input device has difficultly allowing quick menu selection because the directions in which menus are moved are limited to the vertical directions (upward and downward directions) or the horizontal directions (leftward and rightward directions).

SUMMARY OF THE INVENTION

Accordingly, in order to overcome the above-described problems, it is an object of the present invention to provide an input device which allows a predetermined input section to be pressed and which allows cursor movement when, for example, carrying out menu selection, without impairing the operability of the input device.

It is another object of the present invention to provide an input device which makes it possible for an operator to reliably know that he/she has pressed the input device.

To these ends, according to a basic form of the present invention, there is provided an input device comprising a planar input that allows a coordinate input operation; indicator section provided at a surface of the planar input, the indicator section indicating a plurality of input sections; and a control section that generates an operation signal in accordance with an input signal that the control section has received from the planar input. When the input device is set in a predetermined input mode, the control section detects that any one of the input sections has been touched, and generates an operation signal in accordance with a prescribed item of the input section. On the other hand, when the input device is set in another mode, the control section recognizes the input signal from the planar input as coordinate data regardless of what is indicated at the touched input section.

In the basic form, the operation of any one of the input sections and the input operation of coordinate data that is carried out without considering the input section can be carried out in the same operational plane. Therefore, large movements of fingers are not required, so that the operability of the input device is not impaired.

In one form of the basic form of the present invention, the input device further comprises a display mechanism disposed beside the planar input. When the input device is set in the another mode, the display mechanism provides a display in correspondence with the coordinate data.

In still another form of the basic form of the present invention, the input device further comprises a tactile feedback generator that provides a pressing reaction force produced when any one of the input sections formed at the indicator section is pressed.

The input device may comprise a plurality of the tactile feedback generators that are separately provided at locations in correspondence with the input sections formed at the indicator section.

The tactile feedback generator may be provided at only one location at the back side of the planar input. Furthermore, the tactile feedback generator may be formed using dome-shaped inversion plates disposed at the back side of the planar input.

By virtue of this structure, the operator can know that he/she has performed a pressing operation, so that it is possible to prevent, for example, the operator from forgetting to perform the pressing operation. Therefore, it is possible for the operator to reliably perform the pressing operation.

When the tactile feedback generator is formed using dome-shaped inversion plates disposed at the back side of the planar input, a switch input operation may be performed by the inversion plates.

In this case, since the switch input operation is not performed until any one of the inversion plates is inverted, it is possible to prevent an input operation when the indicator section is only touched.

BRIEF DESCRIPTION OF THE DRAWINGS

FIGS. 2A and 2B are sectional views taken along line 2—2 of FIG. 1, in which FIG. 2A shows a state of the input device before the operation thereof and FIG. 2B shows a state of the input device during the operation thereof.

FIGS. 7A and 7B are sectional views taken along line 7—7 of FIG. 6, in which FIG. 7A shows a state of the input device before the operation thereof and FIG. 7B shows a state of the input device after the operation thereof.

DESCRIPTION OF THE PREFERRED EMBODIMENTS

Figure 1:
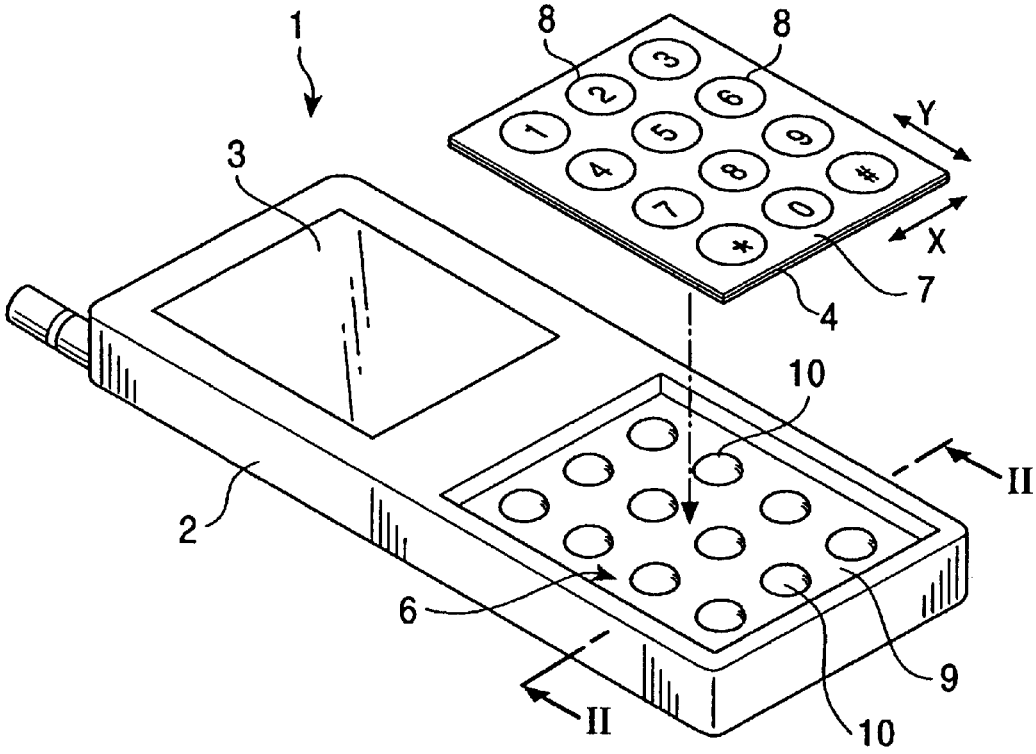
FIG. 1 is an exploded perspective view of a first embodiment of an input device in accordance with the present invention.
Figure 2A:
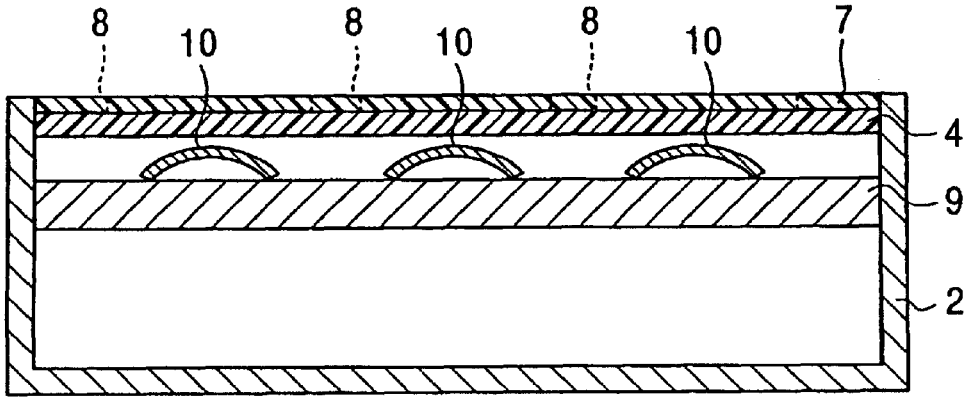
Figure 2B:
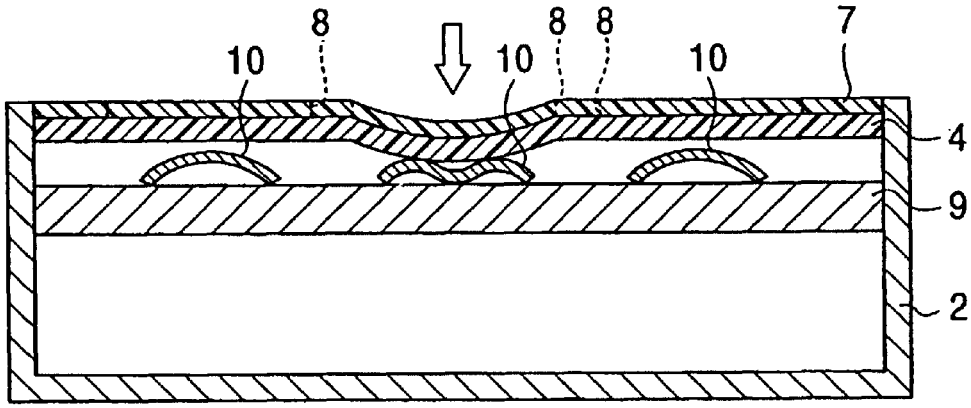
Figure 3:
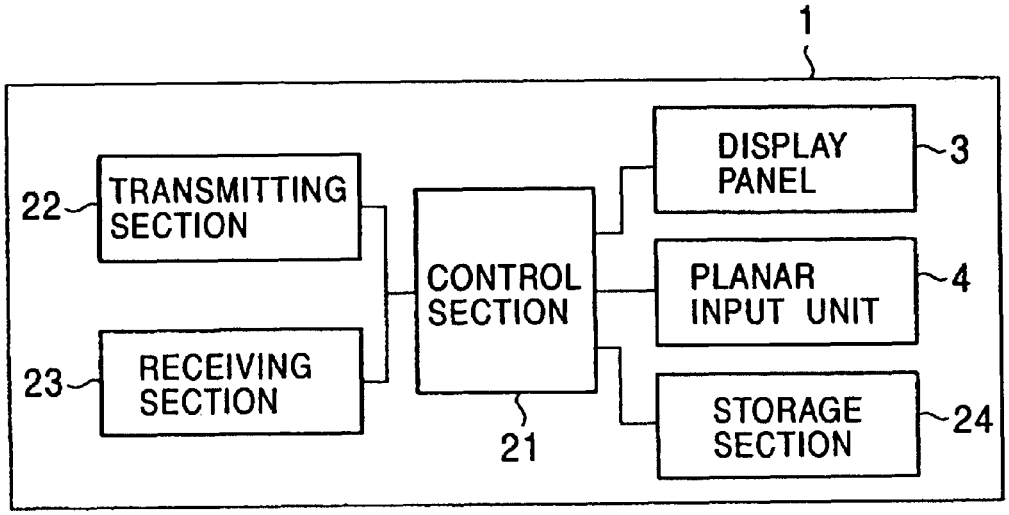
FIG. 3 is a block diagram showing the functions of the input device.
Figure 4:
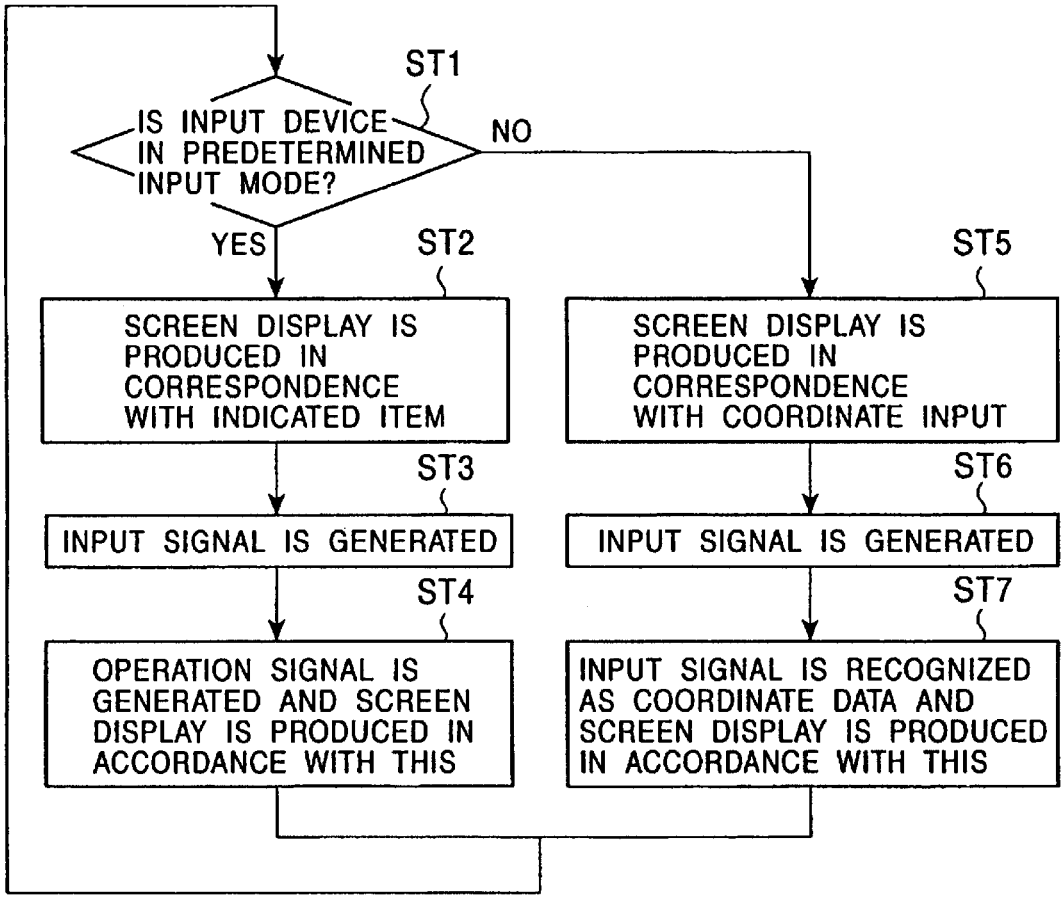
FIG. 4 is a flowchart of switching between input modes.

FIG. 1 is an exploded perspective view of a first embodiment of an input device in accordance with the present invention. FIGS. 2A and 2B are sectional views taken along line 2—2 of FIG. 1, in which FIG. 2A shows a state of the input device before the operation thereof and FIG. 2B shows a state of the input device during the operation thereof. FIG. 3 is a block diagram showing the functions of the input device. FIG. 4 is a flowchart of switching between input modes.

In one embodiment, shown in FIG. 1, the input device 1 is a portable telephone. In the input device 1, a display panel 3, serving as a display mechanism, and a planar input unit 4, serving as a planar input, are mounted to a case 2. The display panel 3 may be a monochromic or a color liquid crystal display panel or an electroluminescent (EL) panel.

For the planar input unit 4, a capacitance type or a pressure-sensitive type may be mounted. In the capacitance type planar input unit, an X-direction detecting electrode and a Y-direction detecting electrode, both of which are formed of a conducting material such as Ag (silver) paste, oppose each other in a matrix arrangement. An insulating sheet with a predetermined dielectric constant is sandwiched between the X-direction detecting electrode and the Y-direction detecting electrode. The insulating sheet may be a resin sheet formed of, for example, PET (polyethylene terephthalate). By disposing the insulating resin sheet and the electrodes on a substrate having an electrically conductive pattern formed on a second resin sheet, the input unit 4 may be bendable. This makes it possible to input a coordinate when a dielectric member, such as the operator's finger, touches the surface of the planar input unit 4.

The pressure-sensitive type planar input unit includes a resistor having a potential difference provided in the X and Y directions, and a conductor member opposing the resistor. When the input unit 4 is pressed with, for example, the operator's finger, the conductor member and the resistor are brought into contact with each other, thereby changing the resistance value. This makes it possible to input a coordinate.

An indicator sheet (indicator section) 7 is placed upon and secured to the operating-side of the planar input unit 4. (See FIGS. 1 and 2A and 2B). The indicator sheet 7 may be another resin sheet formed of, for example, PET, and may have a plurality of input sections 8 of, for example, numbers and symbols printed on its surface. In addition, circular frames indicating the input allowing locations may be formed around the numbers and symbols, so that they are formed within their corresponding frames.

A tactile feedback generator 6 is provided at the back side of the planar input unit 4. The tactile feedback generator 6 may have a glass-epoxy-resin or a metallic base 9 provided inside the case 2, with dome-shaped (diaphragm-like) inversion plates 10 being formed on the base 9. The inversion plates 10 may be provided separately at locations in correspondence with the input sections 8.

In the state shown in FIG. 2A prior to the operation of the input device 1, neither the planar input unit 4 nor the indicator sheet 7 are deformed. In addition, the inversion plates 10 are maintained in their dome-shaped forms. In this state, when a desired input section is pressed from above by the operator's finger or with a pen, the planar input unit 4 and the indicator sheet 7 are both bent and deformed, and are in depressed states. When the corresponding inversion plate 10 is inverted by the pressing force that is produced at this time, a pressing reaction force is produced by the corresponding inversion plate 10. This pressing reaction force is transmitted to the operator's finger and causes the operator to experience tactile feedback. Therefore, the operator can know that he/she has definitely pressed the corresponding inversion plate 10.

As shown in FIG. 3, the input device 1 includes a control section 21. The display panel 3 and the planar input unit 4 are connected to the control section 21 in order to be controlled thereby. In addition, a transmitting section 22, a receiving section 23, and a storage section 24 are connected to the control section 21. Sound signals and data signals may be transmitted from the transmitting section 23 to the outside and received by the receiving section 23 from the outside. Telephone number data, various setting data, and display data to be displayed on the display panel 3 are stored in the storage section 24.

The control section 21 allows two different types of input operations in two different modes, a first (or predetermined) input mode and a second input mode. When the input device 1 is set in the first input mode, the input device 1 can detect that a corresponding input section 8 has been pressed. Then, in correspondence with the prescribed item indicated at the corresponding input section 8, an input signal is applied in order to generate an operation signal based on this input signal. When the input device 1 is set in the second input mode, regardless of what is indicated at the corresponding input section 8, the input signal is provided when the input device 1 detects the operator's finger (for example) contacts the surface of the planar input unit 4. In the second input mode, the input signal is recognized as coordinate data in order to generate an operation signal and may react accordingly to movement of the operator's finger.

When the input device 1 is set in the first mode, the display panel 3 provides a display of, for example, numbers, which can be input. When the input device 1 is set in the second mode, the display panel 3 provides, for example, a display which allows menu selection, or a display which allows the movement of a displayed cursor.

For example, when a homepage (that is, a web page) is displayed on the screen of the display panel 3, a cursor is displayed on the display panel 3, and can be moved freely in various directions in an X-Y plane by an input operation of the planar input unit 4. When the cursor is moved in order to determine the menu selection location, an operation for determining the menu is subsequently carried out. This determination operation may be executed, for example, by tapping the surface of the planar input unit 4 or by operating an operating member (not shown) that is provided separately of the planar input unit 4 inside the case 2. The detection of the tapping operation may be performed by distinguishing between changes in the load when a corresponding inversion plate 10 is pushed and inverted and changes in the load when a corresponding inversion plate 10 is tapped and is not inverted.

In the input device 1, software in the control section 21 determines whether the first input mode or the second input mode is active and processes the data accordingly. This allows automatic switching between the input modes, so that switching between displays on the display panel 3 in accordance with the input modes can be performed.

A description of the processing operation at the control section 21 of the input device 1 will now be given.

As shown in FIG. 4, in Step 1 (ST1), the control section 21 determines whether the input device 1 is in the predetermined (first) mode, that is, in a state which allows an input operation in correspondence with the prescribed item that is indicated at a corresponding input section 8. If the input device 1 is in the predetermined input mode in ST1, the process proceeds to ST2 in which the screen of the display panel 3 provides a display in correspondence with the prescribed item at the corresponding input section 8 (such as a number pad). Then, the process proceeds to ST3. When the corresponding input section 8 of the planar input unit 4 is pressed, an input signal based on the prescribed item of the pressed input section 8 is generated. In ST4, when an operation signal based on the input signal is generated, the display panel 3 provides a display in correspondence with the operation signal.

When the control section 21 determines that the input device 1 is in the second mode in ST1, the process proceeds to ST5 in order for the display panel 3 to provide a screen display in correspondence with the input coordinate data, such as a menu selection screen display or a cursor movement screen display. Then, the process proceeds to ST6. When the planar input unit 4 is operated, an input signal, which may have nothing to do with what is indicated at the corresponding input section 8, is generated from the planar input unit 4. Thereafter, the process proceeds to ST7 where the input signal is recognized as coordinate data. The display panel 3 provides a display in correspondence with this coordinate data.

In the input device 1, the inversion plates 10 are simply dome-shaped metallic plates for allowing the operator to feel the operation that he/or she has carried out. However, these inversion plates 10 may be formed so as to allow switch input operations as a result of being inverted.

Figure 5:
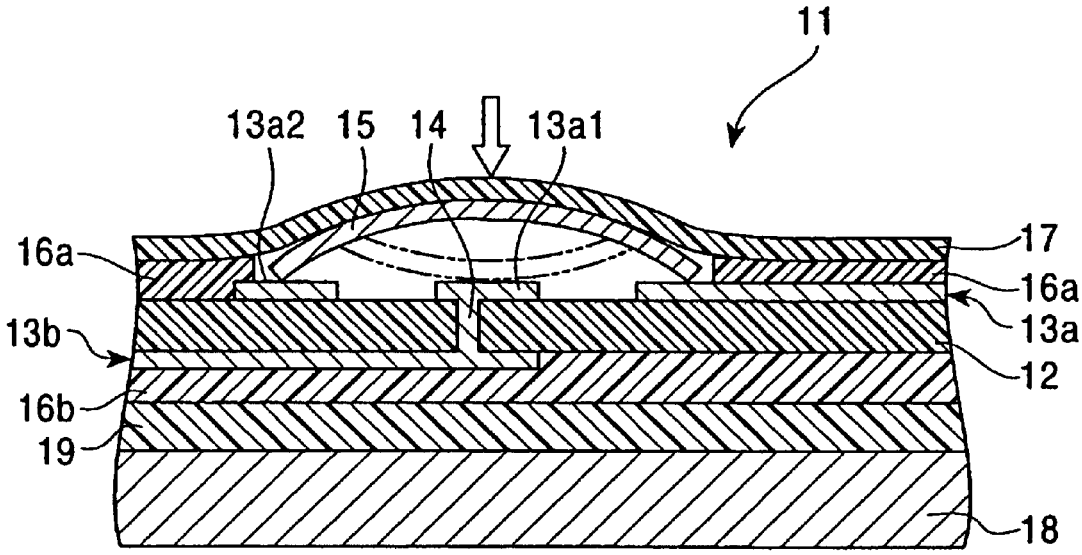
FIG. 5 is a sectional view of a operation feel generating means.

In FIG. 5, the illustrated inversion plate 10 is constructed as a switch element 11 which can be used for a switch input operation.

As shown in FIG. 5, the switch element 11 comprises an electrically conductive pattern 13b and an electrode 13a, serving as conductor members and formed of Ag paste. The electrically conductive pattern 13b and electrode 13a are formed by printing or the like into patterns on both sides of a resin sheet 12 (formed of PET).

The electrode 13a is formed on the top surface of the resin sheet 12, with a circular electrode 13a1 being formed in the center thereof, and an annular electrode 13a2 being formed around and at a predetermined distance from the electrode 13a1. An electrically conductive pattern may be formed continuously with a portion of the electrode 13a2. The electrically conductive pattern 13b is formed at the bottom surface of the resin sheet 12, and is connected to the electrode 13a1. A through hole is formed in a portion of the resin sheet 12 below the electrode 13a1. A coupling conductor member 14 that electrically connects the electrically conductive pattern 13b and the electrode 13a1 is formed in the through hole. A dome-shaped (diaphragm-like) inversion plate 15 is formed on the electrode 13a2. The inversion plate 15 is provided so that its peripheral edge is in contact with the electrode 13a2 and so that the location of the top portion of the inversion plate 15 and the location of the electrode 13a1 correspond with each other.

Resist films 16a and 16b are provided around the inversion plate 15 and at the bottom surface of the electrically conductive pattern 13b, respectively. The entire surface is laminated with a resin sheet 17 formed of PET, and a resin or a metallic base 18 is coupled to the bottom surface of the resist film 16b through an adhesive layer 19, whereby the switch element 11 is constructed.

When the operator presses the planar input unit 4 with his/her finger from thereabove, the planar input unit 4 and the indicator sheet 7 are elastically deformed, and the corresponding inversion plate 15 is pushed by the pushing force produced by the operator. This causes the inversion plate 15 to be inverted as shown by the alternate short and long dashed lines in FIG. 5, so that the inversion plate 15 comes into contact with the electrode 13a1. As a result, the electrode 13a and the electrically conductive pattern 13b are brought into electrical conduction with each other, causing the switch output to be switched to an ON output. Therefore, in the above-described case, the input signal generated at the planar input unit 4 is ignored. In addition, by inverting the inversion plate 15, the operator feels the operation he/she has carried out as a result of the pressing reaction force produced at this time.

Figure 6:
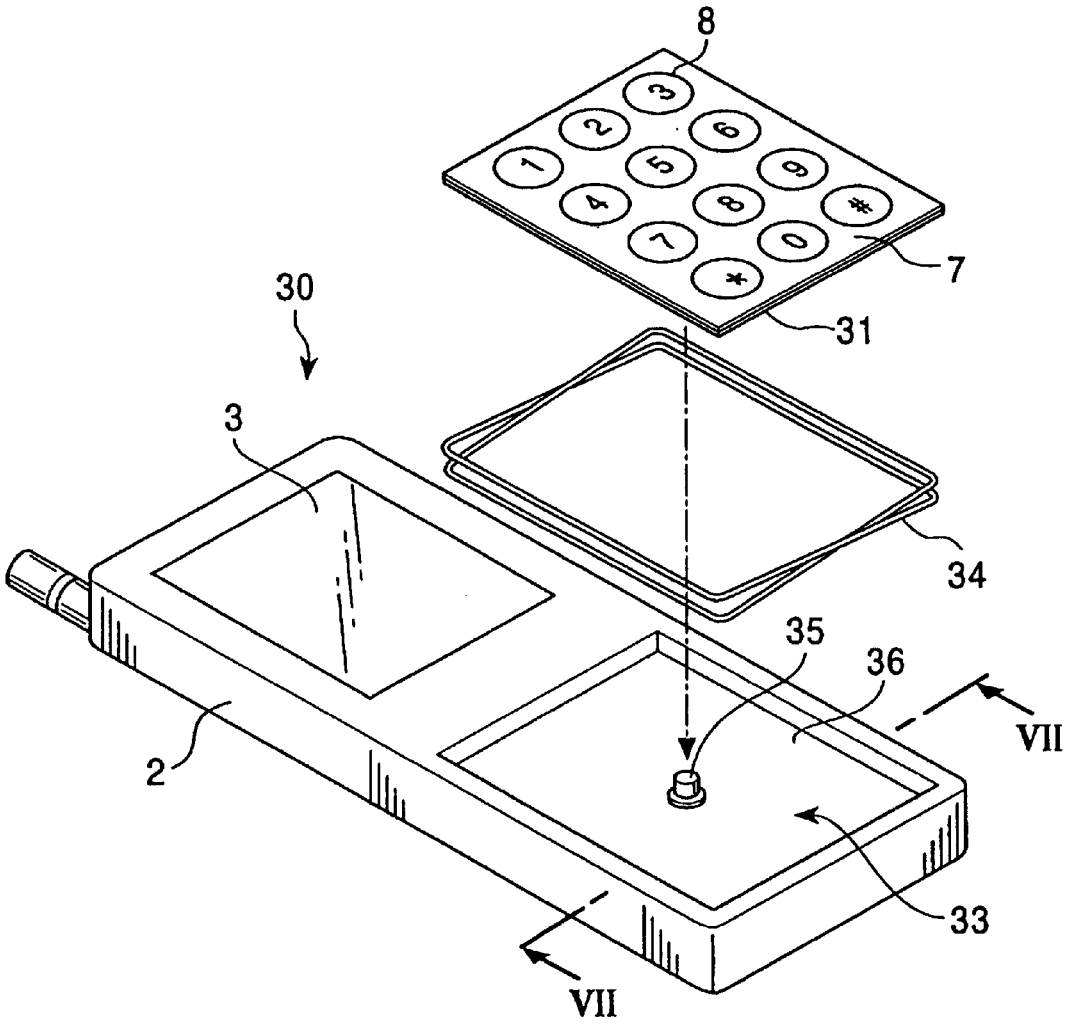
FIG. 6 is an exploded perspective view of a second embodiment of an input device in accordance with the present invention.
Figure 7A:
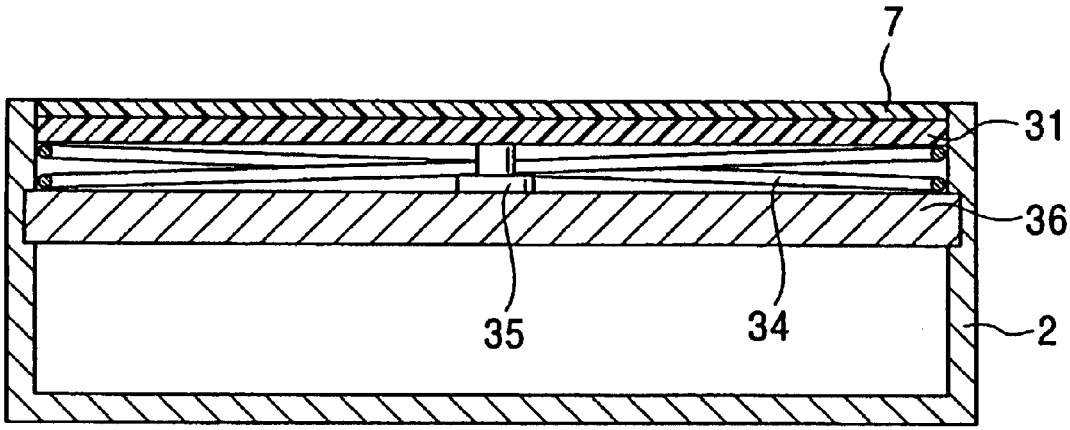
Figure 7B:
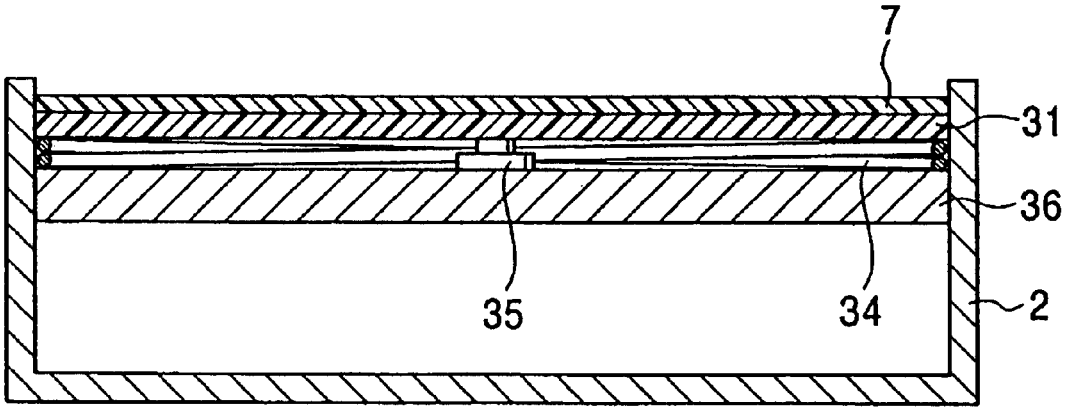

A description of a second embodiment of an input device in accordance with the present invention will now be given with reference to FIGS. 6 and 7. FIG. 6 is an exploded perspective view of the second embodiment of the input device. FIGS. 7A and 7B are sectional views taken along line 7—7 of FIG. 6, in which FIG. 7A shows a state of the input device prior to the operation thereof, and FIG. 7B shows a state of the input device during the operation thereof.

An input device 30 shown in FIG. 6 is formed in a portable telephone. A display panel 3, serving as a display mechanism, and a planar input unit 31, serving as a planar input, are mounted to a case 2. The structural features of the input device 30 are the same as those of the input device 1, except that a planar input unit 31 differs from the planar input unit 4. Therefore, the same structural features will not be described below.

The planar input unit 31 may be a pressure-sensitive type or a capacitance type. In the capacitance-type planar input unit 31, as described above, an X-direction detecting electrode and a Y-direction detecting electrode oppose each other in a matrix arrangement, with a PET (polyethylene terephthalate) resin sheet being sandwiched therebetween. The resin sheet having the electrodes formed thereon are provided on a rigid, glass epoxy or metallic substrate. An indicator sheet 7 similar to that used in the first embodiment is secured to the front side of the planar input unit 31, and a tactile feedback generator 33 is provided at the planar input unit 31.

The tactile feedback generator 33 has one protrusion 35 whose end is supported so as to be movable upward and downward. This protrusion 35 is provided in a concave-shaped base 36, formed inside the case 2, and is formed at the center of the back side of the planar input unit 31. The protrusion 35 is formed so that it causes the operator to feel, for example, a pressing reaction force when he/she presses it from thereabove. The above-described dome-shaped inversion plate may be used to construct the tactile feedback generator 33.

A pantograph 34 is provided as an ascending/descending mechanism between the planar input unit 31 and the base 36.

As shown in FIG. 6, the planar input unit 31 is supported so as to be movable upward and downward by the pantograph 34.

In the state of the input device 30 prior to the operation thereof shown in FIG. 6, the pantograph 34 is slightly raised, so that the planar input device 31 is positioned at the upper end along with the indicator sheet 7. At this time, the planar input unit 31 may be raised by the elastic force of the protrusion 35 or by an electric member (not shown), such as a coil spring, provided at the base 36.

Therefore, when the operator pushes the planar input unit 31 with, for example, his/her finger from thereabove, the pantogragh is folded, causing the entire indicator sheet 7 and planar input unit 31 to be pushed down horizontally. As a result, the operator feels the operation that he/she has carried out as a result of, for example, the pressing reaction force produced when the protrusion 35 is pushed. Consequently, the operator can reliably know that he/she has pressed the planar input unit 31.

Similarly to the input device 1, the input device 30 includes a control section in order to perform switching between a first, predetermined input mode and a different mode (the second input mode). The switching between the first input mode and the second input mode is performed by the same processing operations described above.

The input device of the present invention is not limited in its application to a portable telephone. For example, it may be formed so that the first input mode is set as a television remote control mode and the second input mode is set as a game device controller mode.

As can be understood from the foregoing description, since the input operation in the input mode for generating an operation signal in correspondence with the input section, and the input operation in the input mode for generating coordinate data can be carried out in the same operational plane, quick input operations can be achieved without impairing operability.

In addition, since the reaction force that is produced when the operator presses an input section is transmitted to the operator, the operator is capable of knowing that he/she has definitely performed a pressing operation, thereby making it is possible to restrict erroneous operations.

Furthermore, although the tactile feedback has been represented as a reactive force to the operator's finger, other sensory input mechanisms may be used for tactile feedback. For example, the tactile response may be uniform across the different input sections or may include different thermal or vibrational levels for the different input sections. In this case, the thermal or vibrations may be tuned to the individual input sections thereby permitting a safer, non-visual confirmation of the particular section depressed (if necessary) in addition to restricting possible erroneous operations.

While the invention has been described with reference to specific embodiments, the description is illustrative of the invention and not to be construed as limiting the invention. Various modifications and applications may occur to those skilled in the art without departing from the true spirit and scope of the invention as defined in the appended claims.

What is claimed is:

1. An input device comprising:

a planar input that generates a coordinate input operation;

an indicator section provided at a surface of the planar input, the indicator section having a plurality of input sections; and a control section that generates an operation signal in accordance with an input signal that the control section has received from the planar input, wherein, when the input device is set in ma first input mode, the control section detects that any one of the input sections has been touched, and generates an operation signal in accordance with a prescribed item of the input section, and, wherein, when the input device is set in a second mode, the control section recognizes the input signal from the planar input as coordinate data regardless of what is indicated at the touched input section.

2. An input device according to claim 1, further comprising a display mechanism disposed beside the planar input, wherein, when the input device is set in the second mode, the display mechanism provides a display in correspondence with the coordinate data.

3. An input device according to claim 1, further comprising a tactile feedback generator that transmits a pressing reaction force produced when any of the input sections is pressed.

4. An input device according to claim 1, further comprising a plurality of tactile feedback generators, each tactile feedback generator individually provided at a location of a corresponding input section and transmitting a pressing reaction force produced when the corresponding input section is pressed.

5. An input device according to claim 3, wherein the tactile feedback generator is provided at only one location at a back side of the planar input.

6. An input device according to claim 4, wherein the tactile feedback generators comprise dome-shaped inversion plates disposed at a back side of the planar input.

7. An input device according to claim 6, wherein the inversion plates perform a switch input operation.

8. An input device having a first mode and a second mode, the input device comprising:

a planar input having an upper surface that includes a plurality of input sections, each input section generating a signal when operated; and a control section that determines the mode of the input device and generates an operation signal corresponding to a combination of the mode and the signal received from the planar input, the control section generating a first operation signal when the input device is in the first mode and a second operation signal when the input device is in the second mode, the first operation signal corresponding to a particular function indicated by the contacted input section and the second operation signal corresponding to coordinate data of the contacted input section, the coordinate data independent of the particular function indicated by the contacted input section.

9. The input device of claim 8, further comprising a display mechanism disposed separately from the planar input, the display mechanism providing a display in correspondence with the coordinate data when the input device is in the second mode.

10. The input device of claim 8, further comprising a single tactile feedback generator that produces uniform tactile feedback when any of the input sections is pressed.

11. The input device of claim 10, the tactile feedback being reactive force that resists deformation of the pressed input section.

12. An input device according to claim 10, the tactile feedback generator disposed at a single location at a back side of the planar input.

13. The input device of claim 8, further comprising a plurality of tactile feedback generators, each tactile feedback generator individually provided at a location of a corresponding input section.

14. The input device of claim 13, each tactile feedback generator generating a reactive force that resists deformation of the pressed input section.

15. The input device of claim 14, the reactive forces being uniform with each other.

16. The input device of claim 13, the tactile feedback generators comprising dome-shaped inversion plates disposed at a back side of the planar input.

17. The input device of claim 16, the inversion plates performing a switch input operation.

18. An input device having a first mode and a second mode, the input device comprising:

a planar input having an upper surface that includes a plurality of input sections, each input section generating a signal when operated;

a control section that automatically controls the mode of the input device and generates an operation signal corresponding to a combination of the mode and the signal received from the planar input, the control section generating a first operation signal when the input device is in the first mode and a second operation signal when the input device is in the second mode, the first operation signal corresponding to a particular function indicated by the operated input section and the second operation signal corresponding to coordinate data of the operated input section, the coordinate data independent of the particular function indicated by the contacted input section;

a display mechanism disposed separately from the planar input, the display mechanism providing a display in correspondence with the coordinate data when the input device is in the second mode; and a single tactile feedback generator disposed at one location at a back side of the planar input, the tactile feedback generator producing a uniform reactive force that resists deformation of the operated input section when any of the input sections are pressed.

19. An input device having a first mode and a second mode, the input device comprising:

a planar input having an upper surface that includes a plurality of input sections, each input section generating a signal when operated;

a control section that automatically controls the mode of the input device and generates an operation signal corresponding to a combination of the mode and the signal received from the planar input, the control section generating a first operation signal when the input device is in the first mode and a second operation signal when the input device is in the second mode, the first operation signal corresponding to a particular function indicated by the operated input section and the second operation signal corresponding to coordinate data of the operated input section, the coordinate data independent of the particular function indicated by the contacted input section;

a display mechanism disposed separately from the planar input, the display mechanism providing a display in correspondence with the coordinate data when the input device is in the second mode; and a plurality of dome-shaped inversion plates disposed at a back side of the planar input, each inversion plate individually provided at a location of a corresponding input section and generating a reactive force that resists deformation of the operated input section, the reactive forces of the inversion plates being uniform with each other.

20. A method of increasing operability of an input device, the method comprising:

operating an input section of a planar input;

generating a signal corresponding to the operation of the input section;

automatically controlling a mode of the input device;

generating a first operation signal corresponding to a particular function indicated by the operated input section when the input device is in a first mode and a second operation signal corresponding to coordinate data of the contacted input section when the input device is in a second mode; and ignoring the particular function indicated by the contacted input section when the input device is in the second mode.

21. The method of claim 20, further comprising displaying the coordinate data when the input device is in the second mode in an area separated from the planar input.

22. The method of claim 20, further comprising uniformly generating feedback for the operated input section via a single feedback mechanism provided for the entire planar input.

23. The method of claim 20, further comprising uniformly generating feedback for the operated input section via an independent feedback mechanism provided for each input section.

24. The method of claim 22, the generating of feedback comprising generating a reactive force that resists deformation of the input section.

25. The method of claim 23, the generating of feedback comprising generating a reactive force that resists deformation of the operated input section.

*26. An input device, comprising:*

*an operational plane having an indicator section with input sections;*

*a touch sensitive surface; and*

*a plurality of switches, each switch in the plurality of switches associated with a respective input section,*

*wherein an output of the touch sensitive surface is associated with a touching of a location on the touch sensitive surface, and the output of each of the plurality of switches is associated with one of the input sections.*

*27. The device according to claim 26, wherein the touch sensitive surface is fixedly attached to the operational plane.*

*28. The device according to claim 27, wherein the fixed attachment is a lamination.*

*29. The device according to claim 26, wherein the touch sensitive surface is the operational plane.*

*30. The device according to claim 26, wherein a control section is configured to associate each of the plurality of switch outputs with the respective input section and a touch sensitive surface output as a coordinate value, and output one of a first operation signal or a second operation signal.*

*31. The device according to claim 30, wherein the first operation signal represents a symbol displayed on one of the input sections.*

*32. The device according to claim 30, wherein the second operation signal represents a movement of the touching location.*

*33. The device of claim 26, wherein the operation of one of input sections provides a tactile feedback at the operational surface.*

*34. The device of claim 33, wherein the tactile feedback is provided by a passive member.*

*35. The device of claim 33, wherein the tactile feedback is provided by a vibrator.*

*36. The device of claim 33, wherein the tactile feedback is associated with the switch output.*

*37. The device of claim 30, wherein a tactile feedback is responsive to the first function signal.*

*38. The input device of claim 30, wherein the coordinate signal represents the position of an external operation member with respect to the operational plane.*

*39. The input device of claim 38, wherein the external operation member is a dielectric.*

*40. An input device, comprising:*

*touch sensitive surface, having a plurality of input sections displayed thereon; and*

*a control section,*

*wherein the control section is configured to process an output signal from the touch sensitive surface and output at least one of a first function signal corresponding to one of the operation of one of the plurality of input sections or a coordinate signal representing a location on the touch sensitive surface.*

*41. The device of claim 40, wherein the touch sensitive surface is at least co-extensive with the input sections.*

*42. The device of claim 40, wherein operation of one of the plurality of input sections is by pressing.*

*43. The device of claim 40, wherein the operation of one of the plurality of input sections provides a tactile feedback at the touch sensitive surface.*

*44. The device of claim 40, wherein a tactile feedback member is responsive to the first function signal.*

*45. The device of claim 40, wherein the input sections are displayed by securing an indicator section to a top surface of the touch sensitive surface.*

*46. The device of claim 40, wherein the control section is further configured to output a second function signal representing a tap on the touch sensitive surface.*

*47. An input device, comprising:*

*a touch sensitive surface displaying a plurality of input sections; and*

*a control section,*

*wherein the control section is configured to process an output from the touch sensitive surface and output one of a first function signal or a coordinate signal depending on a first or second operating mode, respectively.*

*48. The device of claim 47, wherein the touch sensitive surface is at least co-extensive with the plurality of input sections.*

*49. The device of claim 47, wherein the first function signal is correlated with operation of one of the plurality of input sections, and the coordinate signal represents a location on the touch sensitive surface.*

*50. The device of claim 47, wherein the touch sensitive surface provides a tactile feedback associated with the operation of one of the plurality of input sections.*

*51. The device of claim 50, wherein the tactile feedback is provided by a passive member.*

*52. The device of claim 50, wherein the tactile feedback is provided by a vibrator.*

*53. The device of claim 50, wherein the tactile feedback member is responsive to the first function signal.*

*54. The device of claim 50, wherein the control section is further configured to output a second function signal representing a tap on the touch sensitive surface.*

*55. An input device having an operational surface, the input device comprising:*

*a planar input that generates a coordinate input operation; and*

*an indicator section provided at a surface of the planar input, the indicator section having a plurality of input sections, the planar input and the indicator section sharing the operational surface of the input device,*

*wherein, in a first mode, the input device detects one of the input sections and generates an operation signal in accordance with a prescribed item of the detected input section, and*

*wherein, in a second mode, the input device recognizes an input signal from the planar input as coordinate data corresponding to touched movement operation.*

*56. An input device having a first mode and a second mode, the input device comprising:*

*a planar input that includes an operational surface having a plurality of input sections on an upper surface of the planar input, the planar input generating a signal when any one of the input sections is operated; and*

*a control section that receives the signal from the planar input and generates an operation signal corresponding to the mode,*

*wherein the control section generates a first operation signal when the input device is set to the first mode and a second operation signal when the input device is set to the second mode, the first operation signal corresponding to a particular function indicated by the operation of one of the plurality of input sections and the second operation signal corresponding to coordinate data indicated by a touched movement operation on the operational surface, and*

*wherein the coordinate data is independent of the particular function indicated by the operated input section.*

*57. An input device comprising:*

*an operational display surface having a plurality of indication display elements showing input positions on a surface of the operational display surface;*

*a coordinate input member;*

*a pressing input member;*

*wherein the operational display surface, the coordinate input member, and the pressing input member are fixedly attached such that they define a shared operational surface; and*

*wherein a first operation signal is output from the pressing input member when a pressing operation is performed at one of the input positions, and a second signal comprising a coordinate signal is output from the coordinate input member in accordance with a movement of a contact position on the operational display surface.*

*58. The input device of claim 57, wherein the fixed attachment is a lamination.*

*59. A planar input device comprising:*

*an operational display surface having a plurality of indication display elements showing input positions on a surface of the operational display surface;*

*first operation-signal-generating means which generates an operation signal in accordance with one of the indication display elements which corresponds to a contact position on the operational display surface; and*

*second operation-signal-generating means which generates an operation signal corresponding to a movement trajectory when the contact position moves on the operational display surface.*

*60. A planar input device, comprising:*

*an operational display surface having a plurality of indication display elements showing input positions on a surface of the operational display surface;*

*a first operation-signal-generating means adjacent the operational display surface, for generating a switch operation signal in accordance with a pressing operation with respect to the indication display elements; and*

*second operation-signal-generating means, for generating an operation signal corresponding to a movement trajectory when a contact position on the display member moves on the operational display surface.*

*61. A planar input device, comprising:*

*a coordinate input sensor disposed under a display sheet that inputs a position of an operating member of a plurality of input positions on the surface of the display sheet when the operating member comes into contact with one of the input positions on the surface of the display sheet; and*

*a signal processing unit that processes a signal from the input sensor and outputs the processed signal as an operational signal correlated to one of the plurality of input positions on the surface of the display sheet; and*

*wherein the planar input device also outputs movement position data corresponding to a movement on the display sheet of the operating member.*

*62. The planar input device of claim 7 wherein the operating member comprises a finger.*

*63. A planar input device, comprising:*

*a first input sensor unit which has a planar shape and which generates a coordinate signal representing a state of contact of an operating member on the first input sensor;*

*a second input switch member acting coplanar with the first input sensor which generates an indication signal corresponding to a particular function and which generates a tactile operation feel; and*

*a control section which processes the coordinate signal.*

*64. The planar input device of claim 8 wherein the operating member comprises a finger.*

*65. An input device, comprising:*

*an input unit that generates an input signal representing coordinate data, the input unit having an input surface;*

*a control section that receives the input signal and generates an operational signal in response thereto; and*

*a tactile feedback generator disposed to provide a pressing reaction force to the input surface in response to a pressing of the input surface;*

*wherein the input unit is supported so as to be movable in a direction upward and downward relative to the input surface.*

*66. The device of claim 65, wherein the input signal is generated by pressing on the input surface.*

*67. The device of claim 65, wherein the input surface comprises a touch sensitive surface.*

*68. The device of claim 67, wherein the touch sensitive surface comprises a capacitance type surface.*

*69. The device of claim 67, wherein the touch sensitive surface comprises a pressure-sensitive type surface.*

*70. The device of claim 65, wherein the input unit is supported by a pantograph mechanism.*

*71. The device of claim 65, wherein the force is a vibration.*

*72. The device of claim 65, wherein the tactile feedback generator operates when the input surface is pressed to generate the input signal.*

*73. The device of claim 65, wherein the input surface is a planar surface.*

*74. The input device of claim 65, further comprising a display disposed adjacent to the input surface.*

*75. The device of claim 65, wherein the input unit is moved in the perpendicular direction by a pressing of the input surface and the tactile feedback generator transmits a pressing reaction force when the input unit is moved.*

*76. An input device comprising:*

*a planar input section that generates an input signal representing coordinate data, the input section having an input surface, wherein the planar input section is supported so as to be movable in a direction upward and downward relative to the input surface;*

*a control section that receives the input signal and generates an operation signal in response to the coordinate signal; and*

*a tactile feedback generator that operates when the planar input section is pressed.*

*77. The input device of claim 76, wherein the input surface comprises a plurality of input sections.*

*78. The input device of claim 77, wherein the plurality of input sections comprise a plurality of symbols.*

*79. The input device of claim 78, further comprising a display disposed adjacent to the plurality of planar input sections.*

*80. The device of claim 77, wherein the feedback generator is a vibration device configured to produce a vibrating force transmitted to the planar input section when the planar input section is moved by pressing.*

*81. The device of claim 78, wherein the plurality of planar input sections is movably supported by a pantograph.*

*82. The device of claim 76, further comprising a display.*

*83. The device of claim 82, wherein the display is disposed adjacent to the plurality of planar input sections.*

* * * * *